(12) United States Patent
Fang (10) Patent No.: US 10,606,248 B2
(45) Date of Patent: Mar. 31, 2020

(54) DATA TRANSMISSION AND CONTROL DEVICE IN A MULTI-NODE SENSOR NETWORK

(71) Applicant: THE WUHAN DIGITAL PET CO., LTD, Hubei (CN)

(72) Inventor: Lei Fang, Hubei (CN)

(73) Assignee: THE WUHAN DIGITAL PET CO., LTD, Hubei (CN)

( * ) Notice: Subject to any disclaimer, the term of this patent is extended or adjusted under 35 U.S.C. 154(b) by 287 days.

(21) Appl. No.: 15/550,376

(22) PCT Filed: Jan. 23, 2016

(86) PCT No.: PCT/CN2016/071803
§ 371 (c)(1),
(2) Date: Aug. 11, 2017

(87) PCT Pub. No.: WO2016/127778
PCT Pub. Date: Aug. 18, 2016

(65) Prior Publication Data
US 2018/0032064 A1    Feb. 1, 2018

(30) Foreign Application Priority Data
Feb. 13, 2015    (CN) .......................... 2015 1 0078266

(51) Int. Cl.
*G05B 19/418*    (2006.01)
*A61B 6/02*    (2006.01)
(Continued)

(52) U.S. Cl.
CPC .......... *G05B 19/41855* (2013.01); *A61B 6/02* (2013.01); *G05B 19/045* (2013.01);
(Continued)

(58) Field of Classification Search
CPC .......... G05B 19/41855; G05B 19/4183; G05B 19/045; G05B 19/0425; G05B 19/418; A61B 6/02; Y02P 90/02
See application file for complete search history.

(56) References Cited

U.S. PATENT DOCUMENTS

2006/0081412 A1* 4/2006 Wright .................... E21B 43/26
181/104
2009/0322542 A1* 12/2009 Ding ........................ F24F 11/30
340/588
(Continued)

FOREIGN PATENT DOCUMENTS

CN    1742275    3/2006
CN    201017459    2/2008
(Continued)

OTHER PUBLICATIONS

"Office Action of China Counterpart Application," dated Oct. 13, 2017, with English translation thereof, p. 1-p. 19.
(Continued)

Primary Examiner — Philip J Chea
Assistant Examiner — Wuji Chen
(74) Attorney, Agent, or Firm — JCIPRNET (57) ABSTRACT

A data transmission and control device in a multi-node sensor network, comprising a processing control module (110). The processing control module (110) comprises an instruction processing unit, a data processing unit, at least one group of first-type interfaces (J101-J10n), at least one group of second-type interfaces (J201-J20n), one group of fifth-type interfaces (J500) and one group of sixth-type interfaces (J600). The fifth-type interfaces (J500) have communication connections with an external control device (120). The first-type interfaces (J101-J10n) respectively have communication connections with a sensor (140) so as to cooperate with the instruction processing unit to configure
(Continued)

and query a parameter of the sensor (140), and to upgrade firmware and report feedback information of the sensor (140) and the processing control module. The second-type interfaces (J201-J20n) respectively have communication connections with the sensor (140) and the sixth-type interfaces (J600) have communication connections with an external service terminal (130) so as to cooperate with the data processing unit to acquire data of a plurality of sensors (140) and transmit the data to the external service terminal (130) for processing. The device controls the sensor (140) via a network, enables the data of the sensor (140) to be modular, and provides a uniform interface to the outside, thus forming a smart control platform for dynamic configuration, data processing and external interaction of the sensor (140).

19 Claims, 4 Drawing Sheets

(51) Int. Cl.
  *G05B 19/042* (2006.01)
  *G05B 19/045* (2006.01)
(52) U.S. Cl.
  CPC ....... *G05B 19/0425* (2013.01); *G05B 19/418* (2013.01); *G05B 19/4183* (2013.01); *Y02P 90/02* (2015.11)

(56) References Cited

U.S. PATENT DOCUMENTS

2011/0289133 A1* 11/2011 Shikano ................. H04L 67/12 709/202
2014/0282486 A1* 9/2014 Hisamoto ................. G06F 8/65 717/173
2014/0350883 A1* 11/2014 Carter ................. A61B 5/6802 702/141
2015/0151960 A1* 6/2015 McCleland ............... B81B 7/02 73/865.8

FOREIGN PATENT DOCUMENTS

| | | |
|---|---|---|
| CN | 101907723 | 12/2010 |
| CN | 202002920 | 10/2011 |
| CN | 102274041 | 12/2011 |
| CN | 103330571 | 10/2013 |
| CN | 103901479 | 7/2014 |
| CN | 103999087 | 8/2014 |
| CN | 203950176 | 11/2014 |
| CN | 104750068 | 7/2015 |
| JP | 2002099328 | 4/2002 |
| JP | 2003141662 | 5/2003 |
| JP | 2011244406 | 12/2011 |
| WO | 2014186715 | 11/2014 |

OTHER PUBLICATIONS

"Office Action of China Counterpart Application," dated Feb. 12, 2018, with English translation thereof, p. 1-p. 8.
"Office Action of Japan Counterpart Application," dated Oct. 30, 2018, with English translation thereof, p. 1-p. 7.
"Search Report of Europe Counterpart Application", dated Aug. 2, 2018, p. 1-p. 8.
"International Search Report (Form PCT/ISA/210)", dated Apr. 28, 2016, with English translation thereof, pp. 1-5.

* cited by examiner

DATA TRANSMISSION AND CONTROL DEVICE IN A MULTI-NODE SENSOR NETWORK

CROSS-REFERENCE TO RELATED APPLICATION

This application is a 371 application of International PCT application serial no. PCT/CN2016/071803, filed on Jan. 23, 2016, which claims the priority benefit of Chinese application no. 201510078266.2, filed on Feb. 13, 2015. The entirety of each of the abovementioned patent applications is hereby incorporated by reference herein and made a part of this specification.

TECHNICAL FIELD

The present disclosure belongs to the field of communication technology and relates to a data processing program, and more particularly, to a processing and control technology for multi-node data.

BACKGROUND

In the current multi-node sensor network, the provision and function of the detector is achieved by integrating the customized electronic circuit with embedded software system through hybrid design of the detector and the control module. The traditional sensor control module is often only provided with the function of data transmission or unchangeable data processing mode, in the sensors used in the PET field, for example, the control module is only allowed to send data or to screen the energy windows and time windows; and, in the energy dispersive spectrometer sensors, the control module is only allowed to perform multi-channel energy spectrum analysis. The configuration parameters of the traditional sensor controller, including the voltage, the gain, the threshold and the like, are all pre-pet and unchangeable.

However, with the continuous development of technology, the version of the software to be configured in a sensor network node is constantly updated, and there is thus usually a need to upgrade software of the sensor network node installed at the running spot. Meanwhile, due to the various applications or requirements, the expected data output is usually different, and there is thus also a need for the data processing mode of the control module and the peripheral parameters of the control module itself to be upgraded correspondingly.

SUMMARY OF THE DISCLOSURE

It is an object of the present disclosure to provide a data transmission and control device in a multi-node sensor network, the device controls the sensors via a network, enables the data of the sensor to be modular, and provides a uniform interface to the outside, thus forming a smart control platform for dynamic configuration, intelligent monitoring, data processing, and external interaction and firmware upgrade and the like of the sensor.

In order to achieve the above object, the solution of the present disclosure is:

A data transmission and control device in a multi-node sensor network includes a processing control module used for data interaction, parameter configuration and firmware upgrade, the processing control module includes an instruction processing unit, a data processing unit embedded with data processing programs for data acquisition and transmission, at least one group of first-type interfaces, at least one group of second-type interfaces, one group of fifth-type interfaces, and one group of sixth-type interfaces; the fifth-type interface is communicatively connected with an external control device, the at least one group of first-type interfaces respectively are communicatively connected with the plurality of the sensors, so as to cooperate with the instruction processing unit to configure and query parameters of the sensors, and to upgrade firmware and report feedback information of the sensors and the processing control module; the at least one group of second-type interfaces respectively are communicatively connected with the plurality of sensors, the sixth-type interfaces are communicatively connected with an external service terminal, so as to cooperate with the data processing unit to acquire data of the plurality of sensors, and to transmit the data to the external service terminal for processing.

The data processing unit further includes a preprocessing step performed between the acquisition and the transmission, which includes one or more of the following data operations as screening, filtering, algorithm implementation, marking, encapsulation, packetization, caching and packet sending.

The processing control module further includes at least one group of third-type interfaces, the third-type interfaces are reserved control interfaces, and is used for the connection with the running status monitoring module of the plurality of sensors and the processing control module, and for the processing thereof;

preferably, the running status monitoring module is any one or more of a running temperature monitoring module for the sensors and/or the processing control module, an environment humidity monitoring module for the sensors and/or the processing control module, a fan control module for the sensors and/or the processing control module, a voltage control module for the sensors and/or the processing control module, an ID information verification module for the sensors and/or the processing control module.

The number of the first-type interfaces and the second-type interfaces is provided to be corresponding to the number of the plurality of sensors, each of the sensors respectively are communicatively connected with the processing control module via a group of first-type interfaces and a group of second-type interfaces.

The instruction processing unit is a first controller used for parameter configuration and firmware upgrade, the data processing unit is a second controller used for data interaction of the plurality of sensors, the one group of fifth-type interfaces and the at least one group of first-type interfaces are provided on the first controller, the sixth-type interfaces and the at least one group of second-type interfaces are provided on the second controller, the third-type interfaces are provided on the first controller or on the second controller.

The first controller and the second controller is any one of an MCU (Micro Control Unit), a DSP (Digital Signal Processing), a CPLD (Complex Programmable Logic Device), and an FPGA (Field-Programmable Gate Array).

The second controller is an FPGA, the data processing program is embedded into the FLASH of the first controller, a plurality of fourth-type interfaces are correspondingly provided between the first controller and the FPGA, the fourth-type interfaces includes a J401 interface and a J402 interface, the J401 interface is used to transmit the firmware configuration data between the first controller and the FPGA, the J402 interface is used to transmit the service data between the first controller and the FPGA;

preferably, the J401 interface is a PS mode configuration interface, the J402 interface is a short-distance data transmission interface, the short-distance data transmission interface is any one of an RS232 interface, an SPI (Serial Peripheral Interface), an I2C (Inter-Integrated Circuit), a GPIO (General Purpose Input Output), an FSMC (Flexible Static Memory Controller), an EPI (Embedded Panel Interface), and a LOCAL BUS.

Preferably, the first controller is an MCU, and the second controller is an FPGA.

The first controller and/or the second controller are provided with a seventh-type interface, which is a peripheral expansion interface used to connect with the peripheral control unit for expansion of RAM and FLASH.

Preferably, the seventh-type interface includes FSMC interfaces for the expansion of RAM, and SPI interfaces or I2C interfaces for the expansion of FLASH.

The first-type interface, the second-type interface, the third-type interface, the fifth-type interface, and the sixth-type interface is any one of an RS232 interface, an RS485 interface, an Ethernet interface, a CAN interface, a fiber interface, an SPI, an I2C, a GPIO or an FSMC;

preferably, the external control device is integrated with the external service terminal;

the data transmission and control device is applied in a PET device as the control device in a front-end electronics system, the processing control module is communicatively connected with the detectors in the front-end electronics system respectively via at least one group of first-type interfaces and at least one group of second-type interfaces, and is used to configure and query parameter, to upgrade firmware, and to report feedback information of the sensors.

A control method of a data transmission and control device in a multi-node sensor network including the following steps:

(1) initialization: after the processing control module is powered on, the clocks and peripherals of the processing control module is configured, the initial parameter of the sensors are configured, and the data processing program are loaded, to get ready for the subsequent data acquisition and transmission, the data of the plurality of sensors is preliminarily processed by the data processing program, and is then transmitted to the external service terminal;

(2) the processing control module monitors, receives, analyzes and processes the control instructions sent by the external control device:

(2-1) in the case when the control instruction is determined to be a query and/or configuration instruction for the parameters of a particular sensor, the parameter information of the sensor is queried and/or configured via a first-type interface which is communicatively connected with the sensor, and is returned to the external control device for processing via the fifth-type interfaces;

(2-2) when the control instruction is determined to be a firmware upgrade instruction for a particular sensor, the processing control module downloads the upgrade program for the particular sensor via the fifth-type interfaces, and the sensor then downloads the upgrade program via a first-type interface which is communicatively connected with it and gets it configured;

(2-3) when the control instruction is determined to be an upgrade instruction for the processing control module, the processing control module downloads the upgrade program, and gets it configured into the processing control module.

In the step (2-3), the first controller determines whether the upgrade is to be performed to the processing control module itself via the fifth-type interfaces: (2-3-1) in the case when the first controller determines the upgrade is to be performed to the processing control module itself, the first controller downloads the upgrade program of the first controller from the external control device via the fifth-type interfaces and gets it configured; (2-3-2) in the case when the first controller determines the upgrade is to be performed to the second controller, the first controller downloads the upgrade program of the second controller from the external control device via the fifth-type interfaces and gets it configured into the second controller via the J401 interface;

alternatively, in the step (2-3), the first controller and the second controller determines respectively via the fifth-type interfaces and the sixth-type interfaces that whether the upgrade is to be performed to the processing control module itself: (2-3-1') in the case when the first controller determines the upgrade is to be performed to the first controller itself; the first controller downloads the upgrade program of the first controller from the external control device via the fifth-type interfaces and gets it configured; (2-3-2') in the case when the second controller determines the upgrade is to be performed to the second controller itself; the second controller downloads the upgrade program of the second controller from the external control device via the sixth-type interfaces and gets it configured.

(3) Monitoring and processing step for the running status of the sensors: the processing control module receives the real-time parameter data of the sensor running status transmitted by the sensor running status monitoring module via one of the third-type interfaces and reports to the external control device, the external control device or the processing control module dynamically changes the configuration parameters of the sensor based on the performance and parameter model of the sensors, so as to make the sensors running in an optimal running status.

The performance and parameter model of the sensor is pre-stored in the external control device, which dynamically changes the configuration parameters of a particular sensor based on the performance and parameter model of the sensors, and transmits the configuration parameters to the sensor through the step (2), so as to make the sensor running in an optimal running status.

With the use of the above-described solution, the present disclosure has the following advantageous effects.

Firstly, with the data transmission and control device in a multi-node sensor network and the control method thereof shown in the present disclosure as a universal platform, the parameters of the sensors can be configured adaptively without changing the overall hardware structure, and the sensor unit can be adapted to various fields simply by changing its firmware online. Meanwhile, it can also adaptively upgrade the data transmission and control device itself, and can change the acquisition, processing and transmission for data of the sensors, so as to obtain expected effect according to actual needs of users, in more particular:

(1) The operation mode, parameters and firmware upgrade of each of the sensors can be performed initiatively, the function of the sensor can be configured initiatively, the sensors can be configured optimally and monitored in real time, and the performance of the sensors can be improved based on the need of users or application scenarios, without changing the overall hardware structure.

Operation mode configuration for a particular sensor: the running status of the sensors is collected beforehand by the processing control module (the first controller), the optimal running status of each of the sensors is then obtained through big data analytics, such that an advice for the optimal configuration file can be given for configuration of the sensors. During the power-on and initialization, the processing control module (the first controller) configures the optimal parameters and running mode for each of the sensors, to make each of the sensors running according to a predetermined mechanism.

Parameter query and configuration for a particular sensor: after the initialization is performed, the processing control module (the first controller) receives and analyzes the instruction for querying and/or configuring parameters of a particular sensor sent by the external control device, and configure/query the parameters of the sensor via the first-type interface which is communicatively connected with the sensor, and report feedback information.

Firmware upgrade for a particular sensor: an upgrade can be dynamically performed to a particular sensor, to change or customize the use of the sensor according to actual needs. After the initialization is performed, if there is a need to change the function of a particular sensor, the external control device sends an instruction to the processing control module (the first controller), which then analyzes the instruction, and embed program downloaded from the external control device to the sensor via a first-type interface which is communicatively connected with the sensor to realize the upgrade, i.e., the altering in function for the sensor.

Real-time monitoring and optimization for the sensors: after the initialization is performed, the processing control module (the first controller) can automatically read the status of the sensors, and can record, monitor, and control in real time the environment data, energy consumption, power quality of the sensors, making the operation information of the sensors clearly visible; meanwhile, the processing control module (the first controller) sends the monitoring information to the external control device, so as to dynamically change the configuration parameters of the sensors based on the performance and parameter model of the sensors.

(2) Acquisition, processing and transmission for the data of the n of the sensor modules according to actual needs. During the power-on and initialization, the processing control module (the first controller) configures the parameters of the clocks, peripherals (i.e., technical indicators of each interface) of the first, second controller and the sensors, and performs firmware embedment for the second controller to embed the data preprocess program into the second controller. The functions of the data preprocess program can be set as needed, and can include acquisition and preprocessing, wherein the preprocessing includes one or more of the following data operations as screening, filtering, algorithm implementation, marking, encapsulation, packetization, caching and packet sending. The second controller is based on, for example, the data acquisition and processing center of FPGA, SRAM, DDR and PHY, and is used to acquire, process, and transmit the data of the sensors according to the predetermined functions of the data preprocessing program.

In addition, the first controller can further upgrade the second controller online, embed data preprocessing programs with various functions into the second controller according to specific needs, and can set up various real-time data processing algorithm platforms and data encapsulation platforms in the processing control module (the second controller): the real-time data processing algorithm platform can provide various combination options for users by providing a series of algorithm IP; the data encapsulation platform can provide a series of standard protocol interfaces, and can also provide user-customized interfaces.

(3) The first controller can further upgrade the first controller itself online. Since there may be different devices connected to the reserved third-type interfaces, the peripheral indicators to be configured by the processing control module (the first controller) in the initialization process may also be different, and, if there is a need to change the function of a particular sensor, the program for the processing control module (the first controller) to configure the parameters of the sensor must be changed correspondingly, and an upgrade for the first controller is thus needed, so as to configure the peripherals of the first and the second controller and the parameters of the sensors effectively and reasonably according to the actual needs for the function of the processing control module.

Secondly, a PET device is also disclosed, including a front-end electronics system, the above-described data transmission and control device in a multi-node sensor network, and an external control system. The external control system includes an external control device used to store program and send instruction, and an external service terminal corresponding to the processing system, the plurality of first-type interfaces of the data transmission and control device respectively are communicatively connected with the plurality of detectors in the front-end electronics system, the fifth-type interfaces are communicatively connected with the external control device and are used for the firmware configuration and upgrade for the sensors and the data transmission and control device, the plurality of second-type interfaces of the data transmission and control device are communicatively connected with the plurality of detectors in the front-end electronics system respectively, and the sixth-type interfaces are communicatively connected with the external service terminal and are used for the data acquisition, transmission and processing of the plurality of detectors.

(1) With the programmable, customizable algorithm center applied as the data preprocessing platform, multi-channel data acquisition can be performed to the detectors, and the data processing can be performed with greater flexibility, for example, the preprocessing, marking, screening and encapsulation of data can be performed freely.

(2) All of the detector modules are allowed to access the external control device online, such that the detectors can interact data and control instructions with the external control device in real time, and can configure parameter and upgrade firmware of the detectors and the data transmission and control device, such that the data transmission and control device can report the abnormal running status of the detectors in real time, to ensure normal operation of the system.

(3) The data transmission and control device can automatically read the status of the detectors, and can record, monitor, and control the environment data, energy consumption, and power quality of the detectors in real time, to make the operation information of the detectors clearly visible.

DETAILED DESCRIPTION OF PREFERRED EMBODIMENTS

The disclosure will now be further described with reference to the drawings.

Figure 1:
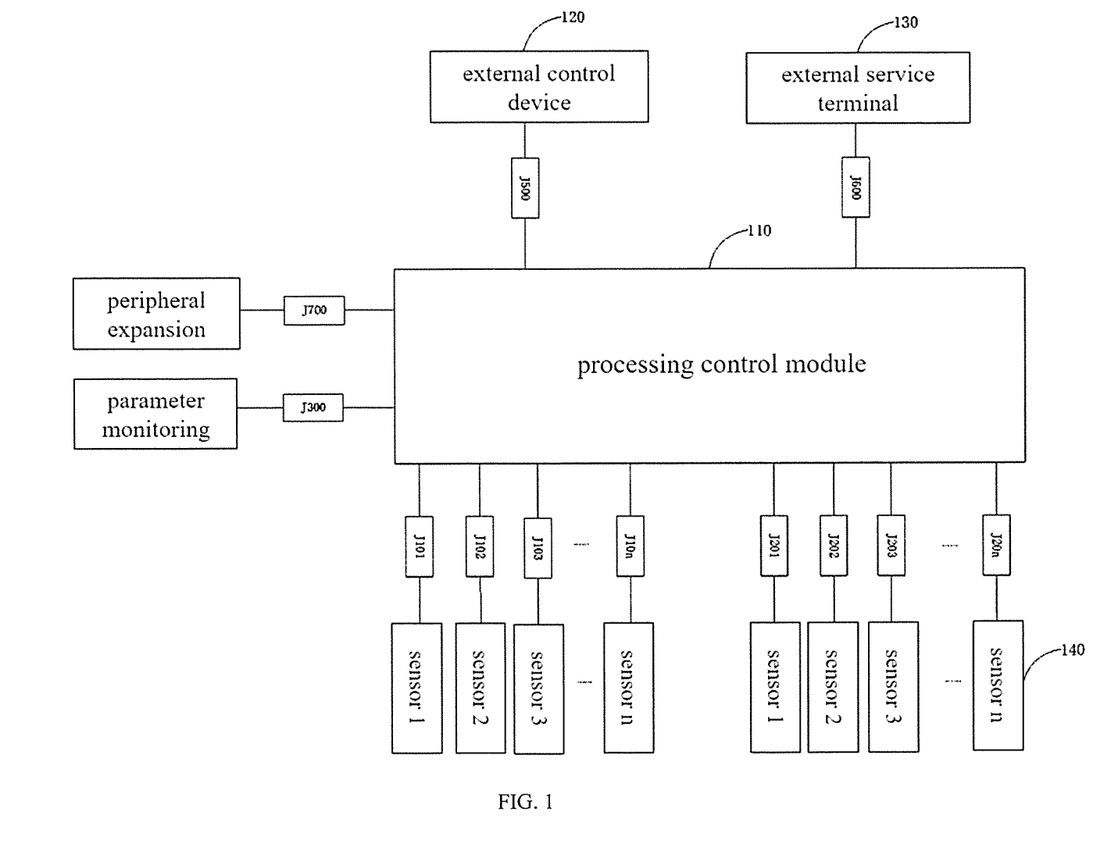
FIG. 1 is a structural schematic view of a first embodiment of the data transmission and control device shown in the present disclosure.

In the first embodiment, a data transmission and control device in a multi-node sensor network is disclosed as shown in FIG. 1. The device includes a processing control module 110 used for data interaction, parameter configuration and upgrade. The processing control module 110 is an integrated processor with a high universality, which allows all the sensors 140 to access the external centralized control device 120 online, and to interact for data and control instructions in real time with the external control device 120. In this way, after parameter configuration for each sensor 140 according to the predetermined function, the multi-channel data acquisition for a plurality of sensors 140 can be realized. In addition, it can process data with greater flexibility including preprocessing, marking, screening and encapsulation for data. Furthermore, it can also configure parameter and update firmware of the sensors 140 and the processing control module 110 at the same time, change the function of a particular sensor 140, and acquire and transmit data as required, without changing the hardware equipment.

Particularly, the above-mentioned processing control module 110 comprises an instruction processing unit, a data processing unit, at least one group of first-type interfaces J101~J10n, at least one group of second-type interfaces J201~J20n, one group of fifth-type interfaces J500 and one group of sixth-type interfaces 3600.

The fifth-type interfaces J500 are communicatively connected with an external control device 120 of the data transmission and control device so as to send control messages and data messages, and report feedback information; the external control device 120 sends control instructions and firmware update programs (including but not limited to upgrade instructions and programs of the sensor 140 and the processing control module 110, particular parameter information query of a particular sensor 140, and the like) to the instruction processing unit of the processing control module 110 via J500, the instruction processing unit reports related control information to the external control device 120 via J500. The fifth-type interface J500 can be any one of an RS232 interface, an RS485, an Ethernet interface, a CAN interface, a fiber interface, an SPI, an I2C, a GPIO or an FSMC, and in the present embodiment, preferably, the fifth-type interface J500 is a CAN interface or an IP interface.

The at least one group of first-type interfaces J101~J10n respectively are communicatively connected with the plurality of sensors 140, so as to corporate with the instruction processing unit and the external control device 120 to query, configure and upgrade a parameter of the sensor 140; the external control device 120 controls the sensor 1401 to sensor 140n respectively via the fifth-type interfaces J500, the instruction processing unit and J101~J10n. The control includes setting the thresholds of the sensor 140, performing normalized calibration for the sensor 140, dynamically setting related parameters of the sensor 140 according to changes in environment to make the sensor 140 running in its optimal status, and the like. The first-type interface J101~J10n can be any one of an RS232 interface, an RS485, an Ethernet interface, a CAN interface, a fiber interface, an SPI, an I2C, a GPIO or an FSMC. In the present embodiment, preferably, the J101~J10n are all RS232 interfaces, and the number thereof is provided to be corresponding to the number of sensors 140, so as to interact information between each of the sensors 140 and the processing control module.

The at least one group of second-type interfaces J201~J20n respectively are communicatively connected with the sensor 140 so as to cooperate with the data processing unit to acquire data of a plurality of sensors 140, the sixth-type interfaces J600 are communicatively connected with an external service terminal 130 so as to transmit the data of the plurality of sensors 140 preliminarily processed by the data processing unit to the external service terminal 130 for subsequent processing. The FLASH of the processing control module 110 is embedded with a data processing program for data acquisition and transmission to form a data processing unit, so as to acquire and transmit data of a plurality of sensors 140. The data processing program further comprises a preprocessing step, which is performed between the acquisition and the transmission, the preprocessing step comprises one or more of the following data operations as screening, filtering, algorithm implementation, marking, encapsulation, packetization, caching and packet sending, and the data processing program can be updated according to the needs of users, and be embedded into the processing control module 110 via the external control device 120 or other devices so as to obtain expected data flows according to various circumstances.

After the power is on, the data processing program is loaded in the initialization process, and the data processing unit of the processing control module 110 begins to acquire raw data of the plurality of sensors 140 respectively via the second-type interfaces J201~J20n, and preliminarily process the raw data through the preprocessing step, the result of the preprocessing can be embedded into various data processing programs as needed. The preprocessing generally includes one or more of the following data operations including altering the multi-channel-output into single-channel-output, screening, filtering, algorithm implementation, marking, encapsulation, packetization, caching and packet sending, and the like. During regular operation, the processing control module 110 is embedded beforehand with a data processing program that has been determined in the preprocessing step, to increase the operational efficiency and save the costs. The processing control module 110 can also be updated after the initialization according to external control instructions, i.e., the processing control module 110 can firstly downloads the update program from external service devices via J500 interfaces or J600 interfaces before the acquisition, processing and transmission of the data of the plurality of sensors 140.

The raw data of the n of the sensors 140 is input into the processing control module 110 respectively via J201~J20n, and the processing control module 110, after receiving the data of each of the sensors 140, preprocess the data of the sensors 140 through the preprocessing step in the data processing program, and then output the data via J600 interfaces. Each of the second-type interfaces J201~J20n and the sixth-type interfaces J600 can be any one of an RS232 interface, an RS485, an Ethernet interface, a CAN interface, a fiber interface, an SPI, an I2C, a GPIO or an FSMC, and in the present embodiment, in view of the large data transmission amount between each of the sensors 140 and the processing control module 110, the second-type interfaces J201~J20n and the sixth-type interfaces J600 are provided to be Gigabit Ethernet interfaces. In addition, the number of the second-type interfaces J201~J20n is provided to be corresponding to the number of the plurality of sensors 140.

In addition, in the present embodiment, at least one group of third-type interfaces in the processing control module 110 is reserved, the third-type interfaces are reserved control interfaces for connection with a running status monitoring module of the plurality of sensors 140 and the processing control module 110, and for the processing thereof, so as to monitor and promptly adjust the operation parameter of the sensors 140 and the processing control module 110, to make them running in an optimal running status. The running status monitoring module is any one or more of a running condition temperature monitoring module for the sensors 140 and/or the processing control module 110, a condition humidity monitoring module for the sensors 140 and/or the processing control module 110, a fan control module for the sensors 140 and/or the processing control module 110, a voltage control module for the sensors 140 and/or the processing control module 110, an ID information verification module for the sensors 140 and/or the processing control module 110. In the present embodiment, one group of third-type interfaces is provided for communication connections with the running status monitoring module of the sensors 140, to monitor the parameters of the sensors 140 in real time, thereby dynamically change the configuration parameters of the sensors 140 based on the performance and parameter model of the sensors 140, to make the sensors 140 running in an optimal running status all the time.

Meanwhile, in view of cost saving and easy manipulation, the external control device 120 and the external service terminal 130 are integrated as the server, the FLASH of which is stored with programs necessary for maintaining constant normal operation of all the sensors 140 and the processing control module 110, such as upgrade program of the sensors 140, upgrade program of the processing control module 110, data processing program, performance and parameter model of the sensors 140 and the like, so as to configure a particular program into a particular hardware equipment according to the needs of the users.

Figure 2:
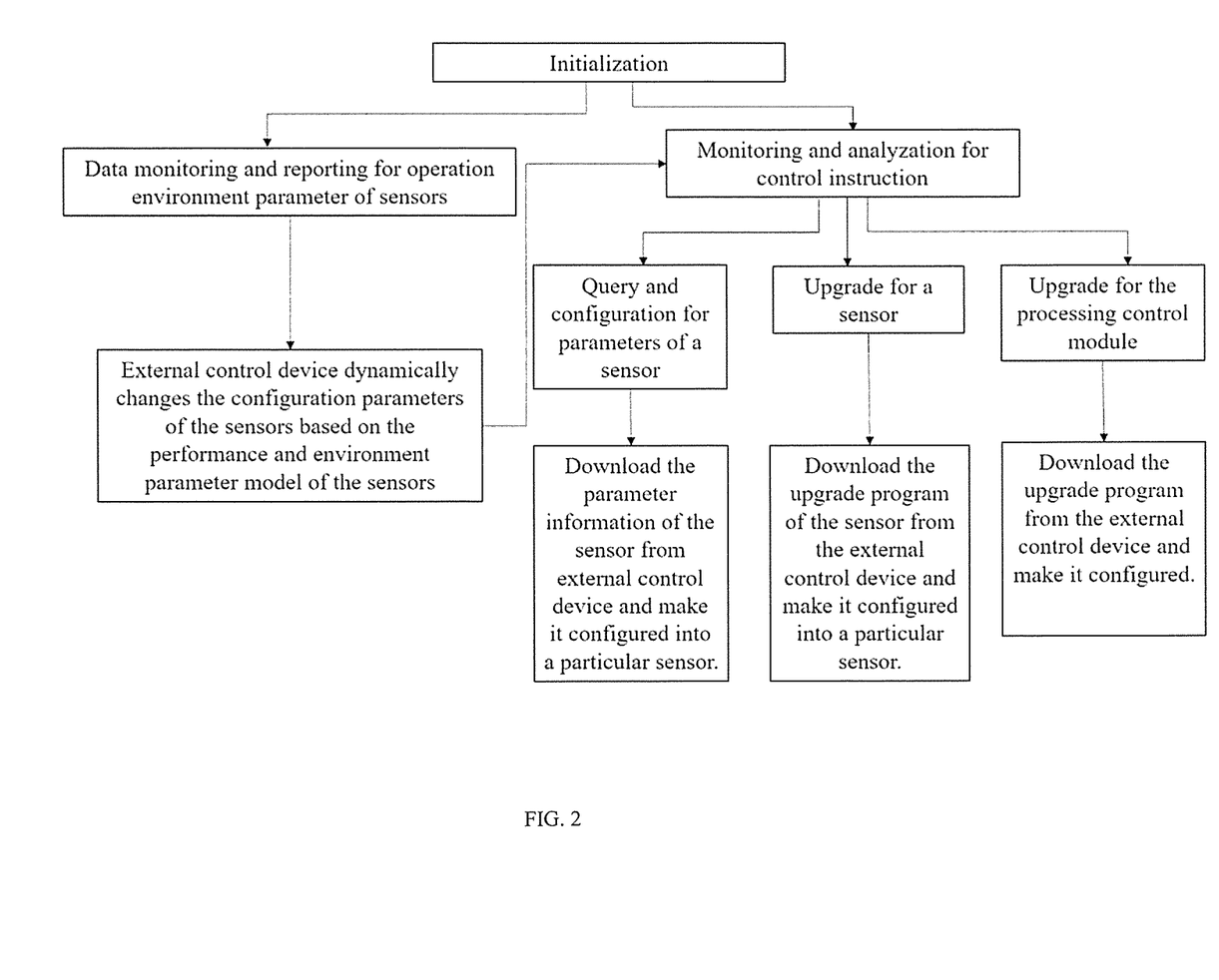
FIG. 2 is a work flow diagram of the embodiment shown in FIG. 1.

The control method of the data transmission and control device in the integrated structure shown in the first embodiment will be described below. The data transmission and control device in a multi-node sensor network includes a plurality of groups of first-type interfaces and second-type interfaces, the number of which corresponding to the number of the sensors 140. One group of third-type interfaces communicating with the running status monitoring module which monitors the sensors 140, fifth-type interfaces used to upgrade firmware and to configure and query the parameter data of the sensors 140, and sixth-type interfaces used to transmit data, as shown in FIG. 2.

(1) Initialization. Firstly, in normal operation, the processing control module 110 is powered on, and the processing control module 110 performs the initialization, which includes configuring parameter for the clock, peripherals, i.e., each of the interfaces, and loading data processing program of the processing control module 110, and configuring the operation parameters of each of the sensors 140.

The running status of the sensors 140 is collected beforehand, the optimal running status of each of the sensors 140 is then obtained through big data analytics, and each of the sensors 140 is then configured during the initialization according to the suggested optimal configuration file. The optimal configuration file of each of the sensors 140 is generally stored beforehand in the processing control module 110. After the initialization is performed, since the data processing program has been loaded, the processing control module 110 begins to acquire and preprocess data of the plurality of sensors 140 via J201~J20n, the data is then sent to the external service terminal 130 via the sixth-type interfaces J600, such that the expected preliminary data of the sensors 140 is obtained.

(2) In the traditional sensor controller, the configuration parameters, including the voltage, the gain, the threshold and the like, has all been pre-set and are unchangeable. However, in the data transmission and control device in a multi-node sensor network shown in the present disclosure, during the acquisition, processing and transmission for the data of the above-described sensors 140, the processing control module 110 further monitors and receives the control instruction sent by the external control device 120 via the fifth-type interfaces, so as to promptly adjust the software and parameters of the sensors 140 or the processing control module 110 itself as required, to make the sensors 140 running in an optimal running status all the time.

(2-1) In the case when the control instruction is determined to be a query and configuration instruction for the parameters of a particular sensor 140, the processing control module 110 queries and configures the parameters of the sensor 140 via the first-type interfaces, and then sends feedback informational the fifth-type interfaces to the external control device 120 for processing.

In the case when the instruction issued by the external control device 120 is determined by the processing control module 110 to be a query instruction for a particular operation parameter of a particular sensor 140, for example, the voltage value, the processing control module 110 sends the query instruction to the sensor 140 via the first-type interfaces which are communicatively connected with the sensor 140, the sensor 140 then queries the parameter information and sends feedback information to the processing control module 110 via the same first-type interfaces which are communicatively connected with it, and the processing control module 110 sends the parameter information to the external control device 120 for displaying via the fifth-type interfaces.

In the case when the instruction issued by the external control device 120 is determined by the processing control module 110 to be a configuration instruction for the operation parameters of a particular sensor 140, the processing control module 110 downloads the parameter configuration information via the fifth-type interfaces, and configures it into the sensor 140 via the first-type interface J10n which is communicatively connected with the sensor 140, and then returns the information indicating the operation parameters are successfully configured to the external control device 120 through the same route, to inform the operator that the operation parameters are successfully configured.

(2-2) In the case when the control instruction issued by the external control device 120 is determined to be an upgrade instruction for a particular sensor 140, the processing control module 110 downloads the upgrade instruction for the sensor 140 via the fifth-type interfaces J500, and configures it into the sensor 140 via the first-type interface J10n which is communicatively connected with the sensor 140, to configure parameters for the sensor 140.

In the case when the instruction issued by the external control device 120 is determined by the processing control module 110 to be an upgrade instruction for a particular sensor 140, similar to the parameter configuration process for the sensor 140, the processing control module 110 downloads the upgrade program for the sensor 140 via the fifth-type interfaces, and configures it into the sensor 140 via the first-type interface J10n which is communicatively connected with the sensor 140, and then returns the information indicating the upgrade is successfully done to the external control device 120 through the same route, to inform the operator that the sensor 140 has been successfully upgraded.

(2-3) In the case when the control instruction is determined to be an upgrade instruction for the processing control module 110, the data transmission and control device downloads the upgrade program and configures it into the data transmission and control device itself via the fifth-type interfaces J500.

In the case when additional interfaces are added to the processing control module 110, or a particular sensor 140 has been upgraded, it is also necessary for the processing control module 110 itself to be upgraded so as to ensure normal operation of each of the interfaces and the sensors 140 after the initialization. When the instruction issued by the external control device 120 is determined by the processing control module 110 to be an upgrade instruction for the processing control module 110 itself, the processing control module 110 downloads the upgrade program of the processing control module 110 via the fifth-type interfaces and gets it configured.

(3) During the acquisition, processing and transmission for the sensors 140, the processing control module 110 further monitors and processes external parameters of the sensors 140 via the third-type interface J30n, so as to provide power configuration, power management, running status monitoring and reporting and the like for normal operation of the sensors 140, to achieve the comprehensive monitoring of the sensors 140.

The processing control module 110 receives the real-time parameter data transmitted by the running status monitoring module of the sensors 140 via the third-type interfaces, and uploads the real-time parameter data to the external control device 120 via the fifth-type interfaces, to inform the users of the real-time running state of each of the sensors 140. In addition, a performance and parameter model of the sensors is stored beforehand in the external control device 120 or the processing control module 110, the real-time parameters of the running status of a particular sensor 140 are substituted into the performance and parameter model of the sensors, and it can thus be determined that whether there is a need for reconfiguration of parameters of the sensor 140. If there is, the configuration parameters of the sensor 140 are then dynamically changed based on the performance and parameter model of the sensors, so as to make the sensors 140 running in an optimal running status all the time.

The performance and parameter model of the sensors is obtained from statistics in repeated simulation experiments. In view of the large data volume to be processed, the performance and parameter model of the sensors is generally provided in the external control device 120, when the external control device 120 determines that there is a need for reconfiguration of the operation parameters of a particular sensor 140, it issues the control instruction to the sensor 140 through the step (2), so as to reduce the task volume of the processing control module 110, and to improve the processing and reaction speed of the whole device.

With the data transmission and control device in a multi-node sensor network shown in the present disclosure, the acquisition, processing and transmission for the data of the plurality of sensors 140 can be realized effectively, and compared to the sensors in the prior art, which used to be passively configured, the sensors 140 are allowed to be controlled initiatively, and adaptive adjustment can be done to each of the sensors 140 and the software of the data transmission and control device itself, without changing the hardware, the versatility and compatibility is relatively high. In addition, each of the sensors 140 is provided as an independent online unit via smart modules. The user can perform various operations via the external control device 120, for example, the user can access to, control, and interact with each of the sensors 140; collect and acquire the status information of the sensors 140; collect and analyze the local data; and download and update the firmware to achieve the functions and the workflows of the sensors 140, so as to cope with different application scenarios.

Figure 3:
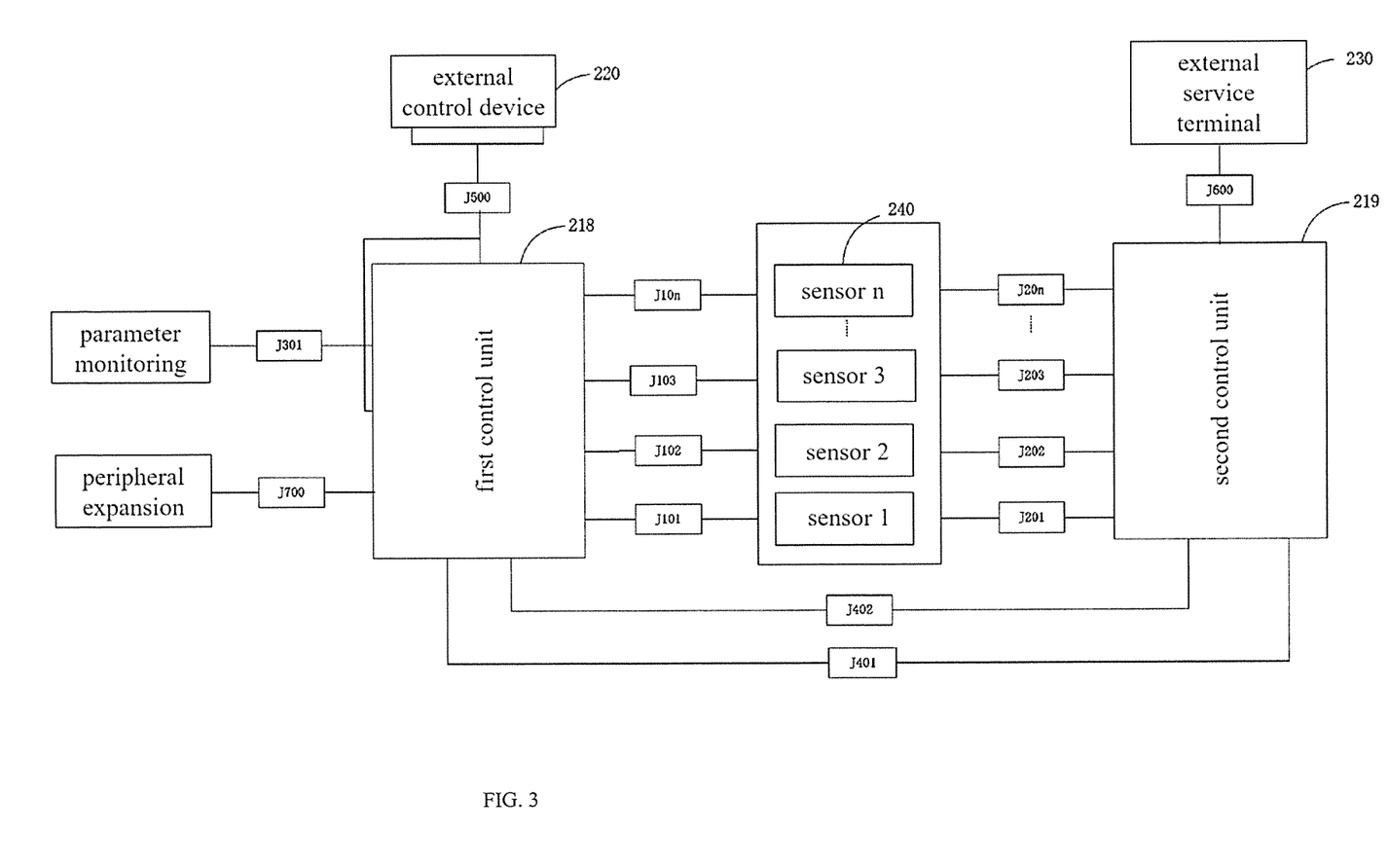
FIG. 3 is a structural schematic view of a second embodiment of the data transmission and control device shown in the present disclosure.

In view of the high requirement for the processing control module, and, correspondingly, the high cost in researching and manufacturing the processing control module to achieving the control of the above-described processes at the same time, the present disclosure discloses another data transmission and control device in a multi-node sensor network in the second embodiment, the processing control module of which comprising, shown as FIG. 3, a first controller 218 used to configure and upgrade parameters, and a second controller 219 used to interact data. The first controller 218 includes one group of fifth-type interfaces, at least one group of first-type interfaces, and an instruction processing unit. The second controller 219 includes one group of sixth-type interfaces, at least one group of second-type interfaces, and a data processing unit. The third-type interfaces are provided on the first controller 218 or the second controller 219, the data processing programs can also be embedded into the FLASH of the first controller 218 or the second controller 219 beforehand.

Taking into account that the processes and data to be processed is too much, which may possibly lead to a lack in the processing capacity of the first controller 218 or the second controller 219, the first controller 218 and/or the second controller 219 is further provided with one group of seventh-type interfaces J700, the seventh-type interfaces J700 are peripheral expansion interfaces for the connection with the peripheral control unit and are used for expansion of RAM and FLASH. In the case when the first controller 218 configures the peripheral FLASH via the seventh-type interface, the data processing programs is generally embedded into the peripheral FLASH, and the seventh-type interfaces include FSMC interfaces for the expansion of RAM, and SPI interfaces or I2C for the expansion of FLASH.

The first controller 218 is provided to be mirroring with the second controller 219, and the functions of the two can be interchanged in practical use to control data and instructions respectively.

The first controller 218 and the second controller 219 can be any one of an MCU, a DSP, a CPLD, and an FPGA. For balancing the cost and efficiency, in the processing control module shown in the present embodiment, the first controller 218 can be any one of an MCU, a DSP and a CPLD so as to achieve an optimal configuration and functions such as online managing, online firmware upgrade and maintenance of the sensors 240, and the second controller 219 is an FPGA for data interaction between the plurality of sensors.

In the case when the second controller 219 is an FPGA, since the data stored in the FPGA is lost each time when the power is off, the data processing program is stored beforehand in the first controller 218, and a plurality of fourth-type interfaces are provided between the first controller 218 and the second controller 219 to interact data and instructions. The fourth-type interface comprises a J401 interface and a J402 interface, wherein the J401 interface is used to transmit firmware configuration data (including data processing programs so as to achieve the function of acquisition and transmission for data of the plurality of sensors 240 of the FPGA) between the first controller 218 and the second controller 219, the J402 interface is used to transmit service data between the first controller 218 and the second controller 219, i.e., to transmit configuration data of the peripheral of the second controller 219, and to transmit noneupgrade data between the first controller 218 and the second controller 219. As a preferred embodiment, the J401 interface is a PS mode configuration interface, the J402 interface is a short-distance data transmission interface, wherein the short-distance data transmission interface is any one of an RS232 interface, an SPI, an I2C, a GPIO, and an FSMC.

The data transmission and control divicine multi-node sensor network shown in the second embodiment will be further described, wherein the first controller 218 is an MCU, the second controller 219 is an FPGA, such that a center, through which programming and algorithm customizing is allowed, is provided as a data processing platform.

Figure 4:
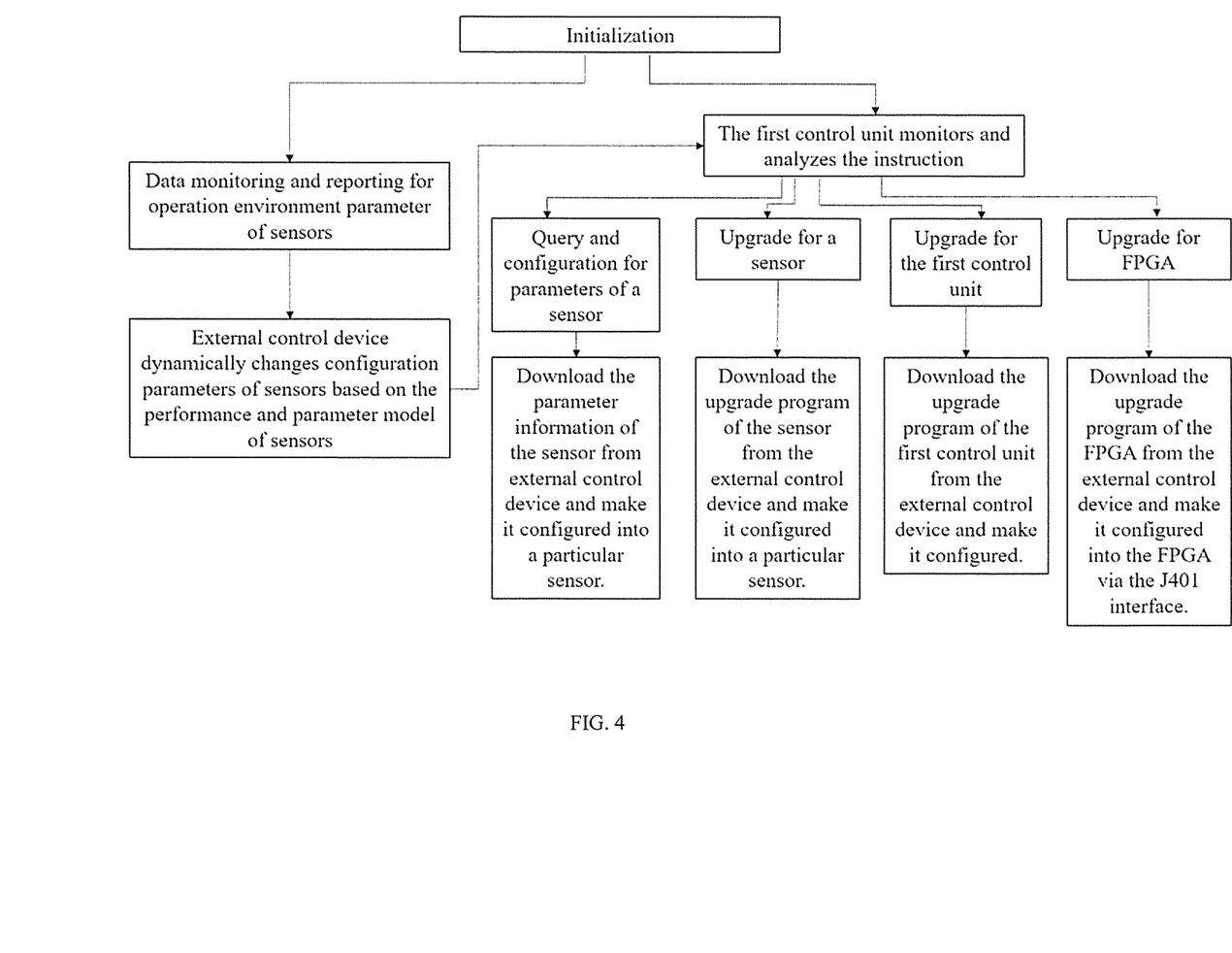
FIG. 4 is a work flow diagram of the embodiment shown in FIG. 3.

The control method of the data transmission and control divicine multi-node sensor network will be described below with reference to the above-described separated configuration, wherein the first controller 218 is a MCU built by an ARM, and the second controller 219 is an FPGA.

(1) Initialization. After the power is on, the clocks and peripherals of the first controller 218 and the second controller 219 is configured, the initial parameter of the sensors 240 is configured, and the data processing program is loaded.

In the case when the data processing program has been embedded beforehand into the first controller 218, the first controller 218 transmits the data processing program via the J401 interface to the second controller 219, the second controller 219 then loads the data processing program, such that the FPGA can acquire data of the plurality of sensors 240, the acquired data is preliminarily processed through data processing program, and is then transmitted to the external service terminal 230; in the case when the data processing program has not been embedded beforehand into the first controller 218, after the initialization is completed, the first controller 218 downloads the data processing program from the external control device 220 via the fifth-type interfaces J500, and makes the data processing program loaded into the second controller 219 via the J401 interface, and the acquisition, processing and transmission for data of the plurality of sensors 240 is performed.

(2) After the initialization, the processing control module acquires, processes and transmits data of the sensors 240; meanwhile, the first controller 218 further monitors, receives, analyzes, and processes the control instruction sent by the external control device 220 via the fifth-type interfaces, the specific steps are as follows:

(1-1) the first controller 218 initiatively configures the clock and the peripherals of the processing control module (including the first controller 218 and the second controller 219);

(1-2) the second controller 219 loads the data processing program;

(1-3) the first controller 218 configures and detects the running voltage of the sensor, so as to make the sensors 240 powered on, the first controller 218 configures the initial operation parameters of the sensors 240, such that the sensors start to operate and send data;

(1-4) the data of the plurality of the sensors 240 is collected and pre-processed through the data processing program, and is transmitted to the external service terminal 230 for subsequent processing via the sixth-type interfaces.

In the case when the type and the amount of the data transmitted to the external service terminal 230 via the data transmission and control divicine multi-node sensor network shown in the present disclosure satisfies the needs of the user, the data transmission and control device shown in the present disclosure can normally acquire and transmit data right after the initialization is completed, without need for any other adjustment. However, in the case when the running condition of the sensor 240 or the requirement of the user is changed, the data transmission and control device shown in the present disclosure can monitor, receive, analyze and process in real time, based on the specific condition, the control instructions sent by the external control device 220 via the fifth-type interfaces, so as to initiatively make adjustments based on the feedback of specific running status, or to make adaptive adjustments based on the needs of users, and further to initiatively determine the operation mode, parameters and firmware of each of the sensor 240, and also the operation parameters of the first controller 218 and the second controller 219.

(2-1) In the case when the control instruction is determined by the first controller 218 to be a query and configuration instruction for a parameter of a particular sensor 240, the first controller 218 queries and/or configures the parameter of the sensor 240 via the first-type interfaces, and sends the feedback information of the query and/or configuration via the fifth-type interfaces J500 to the processing control module for processing.

(2-2) In the case when the control instruction issued by the external control device 220 is determined by the first controller 218 to be an upgrade instruction for a particular sensor 240, the first controller 218 downloads the upgrade program for the sensor 240 via the fifth-type interfaces J500 based on the control instruction, and configures the upgrade program into the sensor 240 via the first-type interface J10$n$ which is communicatively connected with the sensor 240, thereby dynamically adjusts the function and the effect of the sensor 240 as needed.

The external control device 220 transmits the configuration parameters of each of the sensors 240 to the first controller 218 (ARM control panel) via the fifth-type interfaces (in the present embodiment, through Ethernet communication), the first controller 218 (ARM control panel) stores all the configuration and firmware sent by the external processing device into the local file system, and then sends the operation mode, parameters and firmware of the sensors 240 to be upgraded via the first-type interface J10$n$ cooperating with the sensors 240; after the sending is completed, the control unit of each of the sensors 240 upgrades itself; so as to complete the update of the firmware of the sensor 240 array, and to realize various detecting functions.

(2-3) In the case when the first controller 218 determines the control instruction to be an upgrade instruction for the processing control module, the first controller 218 downloads the upgrade program and makes it configured into the processing control module via the first-type interfaces.

(2-3-1) In the case when the first controller 218 determines the control instruction to be an upgrade instruction for the first controller 218 itself, the first controller 218 downloads the upgrade program of the first controller 218 from the external control device 220 via the fifth-type interfaces and gets it configured; the external control device 220 transmits the firmware of the first controller 218 (ARM control panel) to the first controller 218 (ARM control panel) through Ethernet communication, and the first controller 218 (ARM control panel) stores all the configuration and firmware transmitted by the external control device 220 into the local file system, and upgrades itself;

(2-3-2) in the case when the first controller 218 determines the control instruction to be an upgrade instruction for the second controller 219, the first controller 218 downloads the upgrade program of the second controller 219 from the external control device 220 via the fifth-type interfaces, and makes it configured into the second controller 219 via the J401 interface. Application adaptive firmware can be embedded into the ARM platform online, and the ARM can thereby dynamically load the FPGA, to achieve a particular customized algorithm module and detector data processing flow.

In addition, in the case when the second controller 219 is any one of a MCU, a DSP and a CPLD, the second controller 219 can also communicate with the external control device 220 directly via the sixth-type interfaces. In the case when the control instruction is determined to be an upgrade instruction for the second controller 219 itself; the external control device 220 sends the firmware of the second controller 219 to the second controller 219 through Ethernet communication, and the second controller 219 then stores all the configuration and firmware sent by the external control device 220 into the local file system, and upgrades itself.

(3) Dynamical configuration for parameters of the sensors 240. During the acquisition and transmission for the data of the plurality of sensors 240, the sensor 240 that was configured beforehand may not be running in an optimal running status all the time due to various factors such as running hours and external environment. In view of this, third-type interfaces are applied to the data transmission and control device to realize dynamical configuration for parameters of the sensor 240.

After the initialization, in the process when the data transmission and control device shown in the present disclosure performs routine acquisition and transmission for data, it can also monitor and regulate the running status of the sensors and itself via the third-type interfaces. In the case when the third-type interfaces are provided on the first controller 218, the first controller 218 receives the real-time parameter data transmitted by the running status monitoring module of the sensor 240 via the third-type interfaces so as to monitor the running status of the sensors 240 in real time, and dynamically change the configuration parameters of the sensors 240 based on the performance and parameter model of the sensor 240; in the case when the third-type interfaces are provided on the second controller 219, the second controller 219 receives the real-time parameter data transmitted by the running status monitoring module of the sensor 240 via the third-type interfaces, and, subsequently: the second controller 219 dynamically changes the configuration parameters of the sensors 240 based on the performance and parameter model of the sensor 240; alternatively, the second controller 219 transmits the real-time parameter data of each sensor 240 to the first processor unit via the J402 interface, and the first controller 218 dynamically changes the configuration parameters of the sensors 240 based on the performance and parameter model of the sensor 240. Generally, the running status monitoring module of the sensors 240 comprises the monitoring for voltage detection, current detection, power detection, temperature and humidity detection, and the like, and can monitor the status of the power supply and the environment of the sensors 240 in real time. Further, it can also calibrate the detector in real time based on the monitoring information obtained, to ensure optimal performance of the sensors 240.

In the third embodiment, a PET device is further disclosed. The data transmission and control device in a multi-node detector network shown in the present disclosure is applied as the control device of a front-end electronics system, and is configured to acquire and transmit the data sent by the plurality of detectors in the front-end electronics system. The processing control module respectively is communicatively connected with each of the detectors in the front-end electronics system via at least one group of first-type interfaces and at least one group of second-type interfaces, and is used to configure and query the parameters of the detectors, upgrade the firmware, and to report feedback information. More particularly, the PET device applying the data transmission and control device comprises a front-end electronics system, a data transmission and control device in a multi-node detector network described herein, and an external control system, wherein the external control system comprises an external control device used to store programs and to send instructions, and an external service terminal used to reconstruct images. The plurality of the first-type interfaces of the data transmission and control device respectively is communicatively connected with the plurality of detectors in the front-end electronics system. The fifth-type interfaces are communicatively connected with the external control device, and are configured to configure and upgrade firmware of the detectors and the data transmission and control device. The plurality of the second-type interfaces of the data transmission and control device respectively is communicatively connected with the plurality of detectors in the front-end electronics system, the sixth-type interfaces are communicatively connected with the external service terminal, and are configured to acquire, transmit and process data of the plurality of detectors.

The PET device shown in the present disclosure will be further described below. The PET device includes the data transmission and control device with a separated configuration shown in the second embodiment.

The front-end electronics system includes a plurality of detectors, an external control system comprising an external control system and an external service terminal provided integrally, which is preferred to be a server. The data transmission and control device includes a first controller and a second controller.

The first controller is based on the ARM+Linux platform, and the hardware architecture comprises a Cortex M4 kernel ARM with an external SRAM forming a minimal system configured to control a plurality of programmable voltage modules, and detectors for voltage, circuit, temperature and humidity. The transmission of the control information is performed via double-channel CAN bus. The software system is provided to be a Safe RTOS real-time operating system, which provides API interfaces for users and mainly conduct the following work: (1) providing essential elements for the normal operation of the detectors: configuration for a plurality of power supply, configuration for detector parameters; (2) providing support for effective operation of the detectors: real-time monitoring; (3) providing stable operation basis: optimal performance calibration for detectors with the use of monitoring information and known detector performance models.

The second controller is based on FPGA, and is able to achieve various data processing flows, various data processing mechanisms, and various data output format in FPGA according to the needs of users. With respect to the data input and output interfaces, both the second-type interfaces and the sixth-type interfaces are Gigabit network interface, to ensure adequate data channels. The second controller mainly comprises the following three parts as algorithm platform, data processing flow and data output structure. (1) algorithm platform: providing algorithm packet in a particular mode and algorithm customizing functions according to the use of the users. The calculation for the position, time, and energy information, and also configuration for the energy window can be achieved in the PET field. (2) data processing flow: providing particular data processing flow, such as energy calculation, energy window screening, packetization and sending in a particular size, and the like, according to the needs of users. (3) data output structure: providing packaging, marking, and data outputting in a customized data format according to the needs of users. Packets in standard format such as standard TCP, UDP, CAN bus, and packets in various customized format can be obtained.

In addition, the first controller and the second controller cooperate with each other in dynamic maintenance for customized firmware. The dynamic maintenance for customized detector firmware is used for the online upgrade of the detectors, it initiatively changes the firmware according to various uses, to achieve various detecting means. The detecting means mainly comprises: (1) CAN bus control for control information: all of the data transmission and control devices in a multi-node detector network are mounted onto the CAN bus as independent units, so as to facilitate the control for each of the detectors in the detector array, and for each of the detectors in the detector group. With the CAN bus, the control information can be two-way transmitted between the external control device and the data transmission and control device, and the firmware of the detectors can be read into the processing control module according to a particular protocol, so as to change the program of the ARM and the FPGA, and to achieve varieties of detector functions. (2) networking access to the detector array: with the plurality of detectors formed as an array, all of the detectors can be accessed to and controlled atone position through the CAN bus and the CAN bus switch. (3) automatic loading for firmware information (including the ARM and the FPGA): the application adaptive firmware can be embedded into the ARM platform online, and the ARM can thereby dynamically load the FPGA, to achieve a particular customized algorithm module and processing flow for the detector data, so as to complete the firmware updating for the whole detector assembly, and to change or customize the use of the detectors according to actual needs.

The foregoing description of the embodiments is intended to facilitate the understanding and use of the disclosure by those skilled in the art. It will be apparent to those skilled in the art that various modifications can be easily made to these embodiments and that the generic principles described herein will be applied to other embodiments without paying creative work. Accordingly, the present disclosure is not limited to the above-described embodiments, the improvements and modifications made by those skilled in the art without departing from the scope of the disclosure should be within the scope of the present disclosure.

The invention claimed is:

1. A data transmission and control device in a multi-node sensor network, comprising a processing control module used for data interaction, parameter configuration and firmware upgrade, the processing control module including an instruction processing unit, a data processing unit, at least one group of first-type interfaces, at least one group of second-type interfaces, at least one group of third-type interfaces, one group of fifth-type interfaces, and one group of sixth-type interfaces, the processing control module is communicatively connected with a plurality of sensors via the at least one group of first-type interfaces and the at least one group of second-type interfaces, each of the sensors being respectively communicatively connected with the first-type interface and the second-type interface, the processing control module being communicatively connected with an external control device via the fifth-type interface, and being communicatively connected with an external service terminal via the sixth-type interface:

the fifth-type interfaces and the at least one group of first-type interfaces are respectively communicatively connected with the plurality of sensors, so as to cooperate with the instruction processing unit to configure and query parameters of the sensor, and to upgrade firmware and report feedback information of the sensor and the processing control module;

the at least one group of second-type interfaces and the sixth-type interfaces are communicatively connected with an external service terminal, so as to cooperate with the data processing unit to acquire data of the plurality of sensors, and to transmit the data to the external service terminal for processing, wherein the processing control module comprises a first controller used for parameter configuration and firmware upgrade, and a second controller used for data interaction of the plurality of sensors, the first controller comprises the instruction processing unit, the one group of fifth-type interfaces, and the at least one group of first-type interfaces, the second controller comprises the one group of sixth-type interfaces, and the at least one group of second-type interfaces, the at least one group of third-type interfaces are provided on the first controller or on the second controller.

2. The data transmission and control device according to claim 1, wherein the data processing unit further comprises a preprocessing step performed between the acquisition and the transmission, the preprocessing step comprising one or more of the following data operations including screening, filtering, algorithm implementation, marking, encapsulation, packetization, caching and packet sending.

3. The data transmission and control device according to claim 1, wherein the third-type interfaces are reserved control interfaces for cooperating with the instruction processing unit for the connection with the running status monitoring module of the plurality of sensors and the processing control module, and for the processing thereof.

4. The data transmission and control device according to claim 1, wherein the number of the first-type interfaces and the second-type interfaces of each group of the processing control module is provided to be corresponding to the number of the sensors attached to the group of the processing control module, each sensor is communicatively connected with the processing control module via a group of first-type interfaces and a group of second-type interfaces.

5. The data transmission and control device according to claim 1, wherein the first controller and the second controller is any one of an MCU, a DSP, a CPLD, and an FPGA.

6. The data transmission and control device according to claim 1, wherein the second controller is an FPGA, the data processing program in the FPGA, which is used to acquire data of the plurality of sensors and to transmit the data to the external service terminal for processing, is embedded beforehand into the first controller, a plurality of fourth-type interfaces are correspondingly provided between the first controller and the FPGA, the fourth-type interfaces comprises a J401 interface and a J402 interface, the J401 interface is used to transmit the firmware configuration data between the first controller and the FPGA, the J402 interface is used to transmit the service data between the first controller and the FPGA.

7. The data transmission and control device according to claim 1, wherein the first controller and/or the second controller is provided with a seventh-type interface, which is a peripheral expansion interface used to connect with the peripheral control unit for expansion of RAM and FLASH.

8. The data transmission and control device according to claim 1, wherein the first-type interface, the second-type interface, the third-type interface, the fifth-type interface, and the sixth-type interface is any one of an RS232 interface, an RS485 interface, an Ethernet interface, a CAN interface, a fiber interface, an SPI, an I2C, a GPIO or an FSMC.

9. A control method of the data transmission and control device in a multi-node sensor network according to claim 1, comprising the following steps:
(1) initialization: after the processing control module is powered on, the clocks and peripherals of the processing control module are and configured, the data processing program are loaded, and the initial parameter of the plurality of sensors are configured, the data of the plurality of sensors is preliminarily processed by the data processing program, and is then transmitted to the external service terminal;
(2) the processing control module monitors, receives, analyzes and processes the control instructions sent by the external control device:
(2-1) in the case when the control instruction is determined to be a query and/or configuration instruction for the parameters of a particular sensor, the parameter information of the particular sensor is queried and/or configured via a first-type interface which is communicatively connected with the sensor, and is returned to the external control device for processing via the fifth-type interfaces;
(2-2) when the control instruction is determined to be a firmware upgrade instruction for a particular sensor, the processing control module downloads an upgrade program for the particular sensor via the fifth-type interfaces, and the particular sensor then downloads the upgrade program from the processing control module via a first-type interface which is communicatively connected with particular sensor and gets configured;
(2-3) when the control instruction is determined to be an upgrade instruction for the processing control module, the processing control module downloads the upgrade program, and gets it configured into the processing control module.

10. The control method according to claim 9, wherein in the step (2-3), the first controller determines whether the upgrade is to be performed to the processing control module itself via the fifth-type interfaces:
(2-3-1) in the case when the first controller determines the upgrade is to be performed to the processing control module itself, the first controller downloads the upgrade program of the first controller from the external control device via the fifth-type interfaces and gets it configured;
(2-3-2) in the case when the first controller determines the upgrade is to be performed to the second controller, the first controller downloads the upgrade program of the second controller from the external control device via the fifth-type interfaces and gets it configured into the second controller via the J401 interface;
alternatively, in the step (2-3), the first controller determines via the fifth-type interfaces and the second controller determines via the sixth-type interfaces that whether the upgrade is to be performed to the processing control module itself:
(2-3-1') in the case when the first controller determines the upgrade is to be performed to the first controller itself, the first controller downloads the upgrade program of the first controller from the external control device via the fifth-type interfaces and gets it configured;
(2-3-2') in the case when the second controller determines the upgrade is to be performed to the second controller itself, the second controller downloads the upgrade program of the second controller from the external control device via the sixth-type interfaces and gets it configured.

11. The control method according to claim 9, wherein further comprises a step (3), the monitoring and processing step for the running status of the sensors: the processing control module receives in real time the real-time parameter data of the sensor running status transmitted by the sensor running status monitoring module via one of the third-type interfaces and reports to the external control device, the external control device or the processing control module dynamically changes the configuration parameters of the sensor based on the performance and parameter model of the sensors, so as to make the sensors running in an optimal running status.

12. A positron emission tomography (PET) device having a front-end electronics system, comprising: the data transmission and control device according to claim 1 and an external control system, the external control system comprises an external control device used for program storage and instruction sending, and an external service terminal used for image reconstruction, the processing control module is communicatively connected with each of the detectors in the front-end electronics system respectively via at least one group of first-type interfaces and at least one group of second-type interfaces, and is communicatively connected with the external control device via the fifth-type interfaces to configure and query the parameter, upgrade firmware, and report feedback information of the sensors, and is communicatively connected with the external service terminal to reconstruct image.

13. The data transmission and control device according to claim 3, the running status monitoring module is any one or more of a running temperature monitoring module for the sensors and/or the processing control module, an environment humidity monitoring module for the sensors and/or the processing control module, a fan control module for the sensors and/or the processing control module, a voltage control module for the sensors and/or the processing control module, an ID information verification module for the sensors and/or the processing control module.

14. The data transmission and control device according to claim 6, the J401 interface is a PS mode configuration interface, the J402 interface is a short-distance data transmission interface, the short-distance data transmission interface is any one of an RS232 interface, an SPI, an I2C, a GPIO, an FSMC, an EPI, and a LOCAL BUS.

15. The data transmission and control device according to claim 6, the first controller is an MCU, and the second controller is an FPGA.

16. The data transmission and control device according to claim 6, the third-type interfaces are provided on the first controller.

17. The data transmission and control device according to claim 7, the seventh-type interface comprises FSMC interfaces for the expansion of RAM, and SPI interfaces or I2C interfaces for the expansion of FLASH.

18. The data transmission and control device according to claim 8, the external control device is integrated with the external service terminal.

19. The control method according to claim 11, the performance and parameter model of the sensor is pre-stored in the external control device, which dynamically changes the configuration parameters of a particular sensor based on the performance and parameter model of the sensors, and transmits the configuration parameters to the particular sensor through the step (2), so as to make the sensor running in an optimal running status.

* * * * *